United States Patent [19]

Gripp

[11] 4,000,449
[45] Dec. 28, 1976

[54] ELECTRICAL SHAFT SYSTEM
[75] Inventor: Leonard P. Gripp, Amherst, N.Y.
[73] Assignee: Westinghouse Electric Corporation, Pittsburgh, Pa.
[22] Filed: Oct. 22, 1974
[21] Appl. No.: 517,283
[52] U.S. Cl. .................................. 318/72; 318/85; 318/655
[51] Int. Cl.² .......................................... G05B 1/06
[58] Field of Search .............. 318/72, 85, 655, 692
[56] References Cited
UNITED STATES PATENTS

| 2,004,770 | 6/1935 | Setter | 318/72 X |
|---|---|---|---|
| 2,888,129 | 5/1959 | Chapman | 318/72 X |
| 3,076,906 | 2/1963 | Simo | 318/72 X |
| 3,079,531 | 2/1963 | Tugwood | 318/655 X |
| 3,462,665 | 8/1969 | Espey et al. | 318/72 X |
| 3,841,589 | 10/1974 | Appleby et al. | 318/655 X |

Primary Examiner—Benjamin Dobeck
Attorney, Agent, or Firm—C. M. Lorin

[57] ABSTRACT

Two movable members driven by individual motors are positioned accurately at any given time and are tracking each other for all displacements. Individual positioning is used with differential positioning to force a follow-up of one member relative to the other. One feedback position loop provides a master reference for a second position loop of the slave motor drive, and the differential position signal makes the second loop operate as a vernier of the master loop. A limiter prevents the master drive from running ahead of the slave drive.

1 Claim, 5 Drawing Figures

ELECTRICAL SHAFT SYSTEM

BACKGROUND OF THE INVENTION

Whenever two movable members are to be displaced simultaneously between two equal positions on separate trajectories, the natural thing to do is to have them mechanically connected and to drive them together as a unit. However, there are instances where each member must be driven separately. Such an instance is the screwdown system of a rolling mill. In a screwdown system two screw mechanisms are applied at opposite ends of a workroll to accurately position the rolls at a definite gauge for the workpiece to be rolled. In such a case, the prior art makes use of worm gears connected to the screws and a clutch arrangement tying the screws together for balancing out the torques developed. The screws must accurately track one another or they will bind. They must also stop at exact equal positions if the mill roll is maintained level at the required gauge. Accurate tracking and stopping is particularly important when there is automatic gauge control on the mill. Automatic gauge control can be used not only to set the screwdown system but also to correct against workroll deformation, or even to provide controlled bending to shape the workroll under the right and left screwdown mechanism. An illustration of a screwdown system using a clutch between the motor drive of the screws can be found in U.S. Pat. No. 3,096,670 of C. F. Stringer. The same problem is encountered when controlling movement of the edges, or of the sideguides in a rolling mill and it has received a similar solution. In such a case the edges, or the side-guides, are moved laterally toward the pass line into a position of contact with the workpiece, from opposite directions relative to the central line of the workstands. Along these directions they are both retracted, or applied, at the same time.

The modern sophistication of electrical control makes it attractive to do without a clutch between the two drives and to rely on electrical circuitry only in order to create an electrical match between the two drives and the two driven members at all times during the control operation. An example of separate motor drives with no mechanical connection therebetween is found in U.S. Pat. No. 3,789,280 which shows a hoisting system for a conveyance held by several ropes. There, the tension of the ropes has to be kept equalized while lifting or lowering the conveyance under the separate motor drives. A master-slave system is used and any unbalance in the torques serves to compensate for it by controlling the slave motor drive so as to follow the master motor drive. However, such a system, because it relies only on the torques, does not impose an accurate relation between the displacements due to the respective motor drives. The problem there is somewhat different from a situation in which accurate positioning is an important as a good tracking between the movable members.

One object of the present invention is to provide an electrical shaft connecting two individually driven members which are to be moved together.

Another object of the present invention is to provide an improved screwdown system for a rolling mill which accurately controls in position two self-tracking screw mechanisms relative to the workroll.

A further object of the present invention is an improved system for imparting correlative displacements to at least two members moving along a separate trajectories under separate motor drives an without mechanical interconnection.

SUMMARY OF THE INVENTION

In accordance with the present invention, a master-slave motor system includes a slave and a master motor drive each accurately positioning a driven movable member by position feedback control, in which the feedback command of the master drive is used as a reference for deriving a correction error with the feedback command of the slave motor drive. Also, in accordance with the present invention, means is provided for limiting the action of the master motor drive until the correction error is in a proper relation with respect to the correction error.

BRIEF DESCRIPTION OF THE DRAWINGS

FIG. 1 illustrates a position regulating system of the prior art used to accurately and individually position two separate motor drives which are not mechanically connected together. Two motors 1, 2 are coupled with respective mechanisms 3, 4 including the driven movable members. A motor control circuit 9, 10 is associated with each of the motors 1, 2. An indication of the speed of the motor and driven mechanism is provided by a pilot generator 5, 6 and such indication is used in a conventional way within a feedback loop 7, 8 to regulate the speed of the motor, 1 or 2, moving the corresponding member into position. Incremental displacements are instantaneously known from a synchro transmitting device, 11 or 12, connected to a synchro receiving device, 13 or 14, and these are converted into a position signal by a position indicator 15 or 16, to provide on line 41 and 42, a signal representative of the instantaneous position of the member driven by the associated mechanism 3, or 4. Each motor control circuit 9, 10 is controlled by a position regulator 19, 20 which responds to the portion signal, on line 41 or 42, and to a reference signal 21 provided by a reference 23 which is common to both motor drives. Any error between the reference signal 21 and the position signal (41 or 42) will cause, via input line 37 or 38, the motor control circuit 9, or 10, to change the speed of the motor, 1 or 2. Acceleration or deceleration will bring each mechanism 3, 4, within the position range prescribed by reference 23. As a result, the final position of both drives is highly accurate. The two drives are finally stopped at exact position points. Although the final stop of each drive is accurately controlled, the time at which each drive stops may vary. This may be due to different instantaneous speeds of the motor, to different mechanical characteristics of the mechanism 3, 4, imparting movement to the movable members. The loads on the mechanisms may also be different. For instance, in a screwdown system temperature conditions in the workpiece rolled may cause a different hardener to be present under the right as opposed to the left screwdown mechanism. As a result, with the system of FIG. 1, the two drives may not track each other, even though they do stop at the same position point. Such a prior art system can be used on drives which have to be accurately positioned but do not require accurate tracking. Rolling mill edge adjustment drives could accommodate a position regulating system such as shown in FIG. 1.

The servo-mechanism system of FIG. 2 is another prior art system for independently driving two movable members without mechanical interconnection. Here, the two drives track one another. In FIG. 2 and FIG. 1 like reference numerals identify like elements. It appears thus that motors 1, 2 and the associated mechanisms 3, 4 are each adjusted in speed by a main loop 7, or 8, and a motor control circuit 9, 10 as in FIG. 1. In contrast, however, motor 1 and mechanism 3 form a master motor-drive which is position regulated by a position loop including a selsyn transmitting device 11, a selsyn receiving device 13, a position indicator 15, a position regulator 19 responsive to a position signal 41 from the position indicator 15 and to a reference signal 21 from a reference 23. The error so derived modifies the speed of the master motor 1 in accordance with the error detected in such a position loop. The slave motor 2, and slave drive 4 are controlled by the error derived from position regulator 19 so as to follow the master from motor drive. Any discrepancy between the two driven members is detected by a differential device 50 which provides the difference between the outputs of the selsyn transmitting devices 11 and 12. Such difference in fact measures the phase angle between the two selsyns separately driven by the drives. Any difference in phase angle represents a difference in position between the two drives. A demodulator 52 connects the signal 51 so derived into a control signal which is used, via line 52, to modify the effect of the position signal on line 38 from the position regulator 19. A summer 30 combines the signals of lines 52 and 38 and generates an input to the motor control circuit 10 of the slave motor 2 such that the slave mechanism 4 will follow the master mechanism 3.

Figure 1:
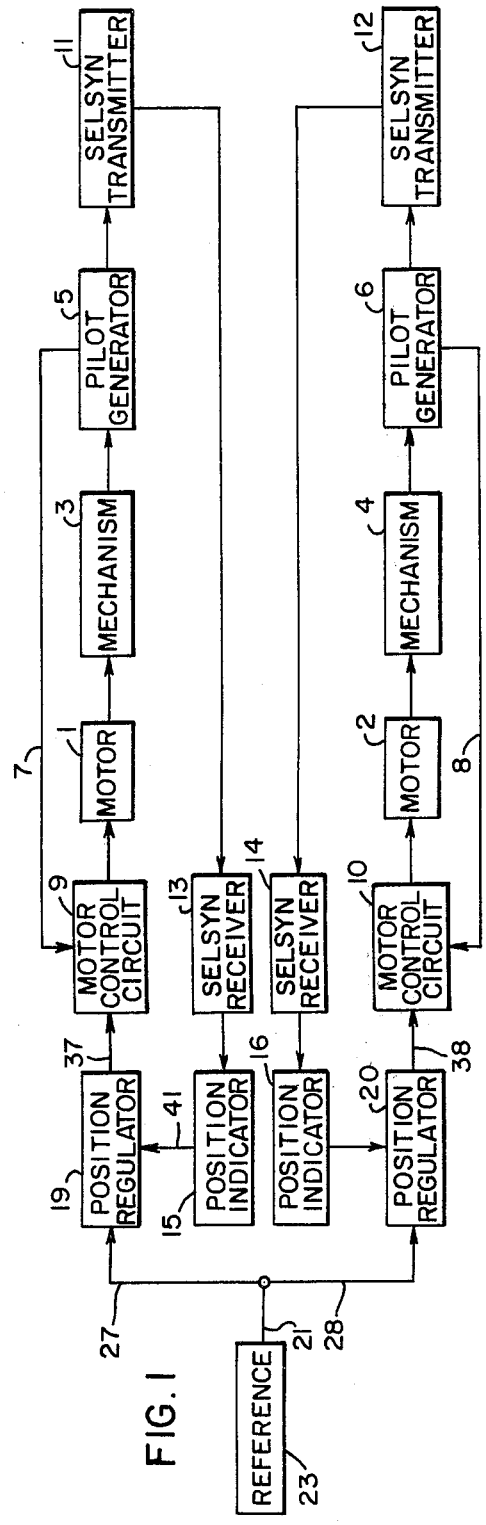
FIG. 1 shows an individual drive position regulating system of the prior art.

In accordance with the correction signal from the corrective loop comprising differential device 50, line 51, demodulator 52, line 53 and summer 30, the speed of the slave motor 2 is increased or decreased so as to follow the master motor 1 and master mechanism 3. Therefore, the two drives track one another. However, this system is not very accurate and the two drives most of the time remain some increment apart in position. The position separation continues to exist when the drives are stopped when both drives are stopped simultaneously. Such a system is very reliable and is suitable for driving sideguides in a rolling mill where highly accurate positioning is not required.

Figure 2:
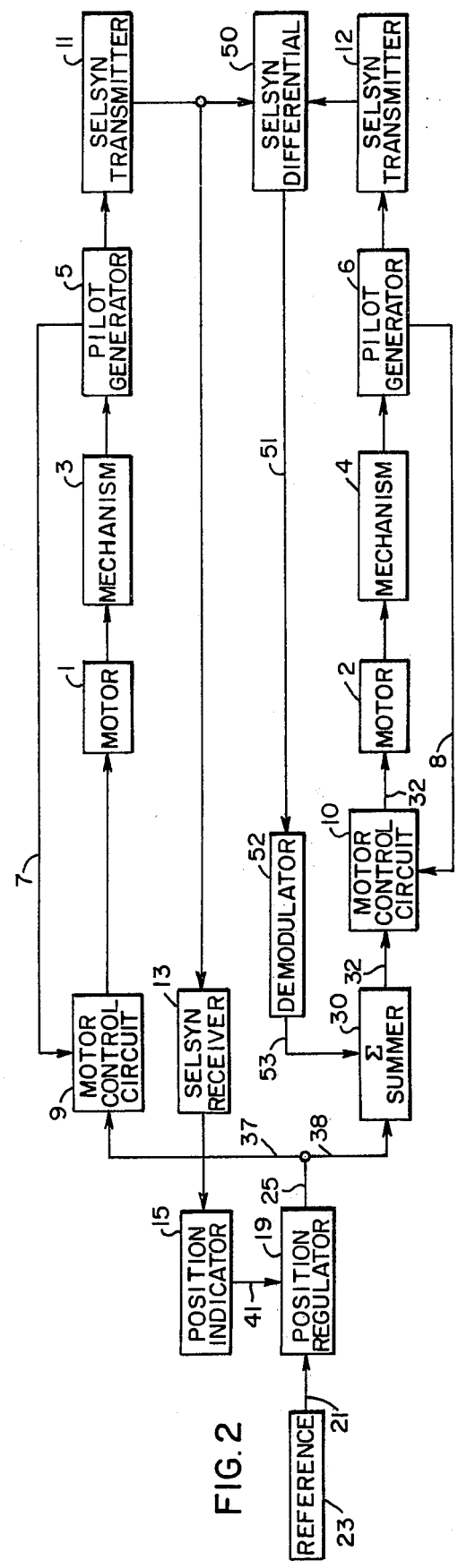
FIG. 2 illustrates a master-slave positioning system of the prior art controlling two drives separately driven.
Figure 3:
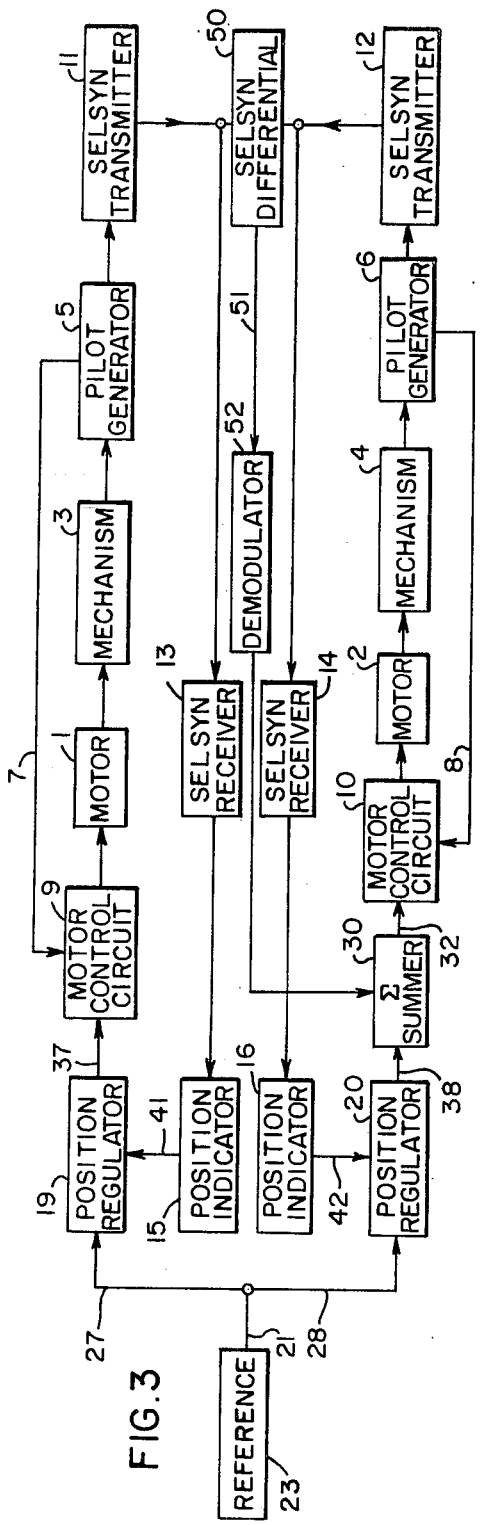
FIG. 3 shows a combined individual drive position regulating system and motor-slave positioning system in accordance with the present invention.

FIG. 3 shows one embodiment of the present invention, with like reference numerals to identify like elements found in FIGS. 1 and 2. The system of FIG. 3 is a slave follow positioning system because it combines the two qualities of the system of FIGS. 1 and 2, without having the disadvantages of the two prior art systems. Each drive is controlled through a feedback position loop. For motor 1 and mechanism 3 the feedback position loop includes selsyn transmitting device 11, selsyn receiving device 13, position indicator 15, line 41, position regulator 19 and line 37, under the reference signal received from lines 21, 27 and reference 23. The feedback position loop of motor 2 and mechanism 4 includes selsyn transmitting device 12, selsyn receiving device 14, position indicator 16, line 42, position regulator 20 and line 38 under the reference signal received from lines 21, 28 and reference 23. A differential device 50 detects the difference between the outputs of the selsyn transmitting devices 11, 12. The phase angle, so measured between the two selsyns, represents a difference in position between the two drives 3, 4. A demodulator 52 converts the signal appearing on line 51 onto a control signal which is inputted via line 53 into a summer 30 where it adds up its effect on the motor control circuit 10 to the error signal received from the position regulator 20. The basic slave follow system of FIG. 2 appears here with the improvement due to individual drive positioning. The two drives are accurately positioned and one drive is caused to follow as a slave of the first drive. Exact positioning control is obtained, and very close drive tracking also. A most accurate system results for both tracking and stopping.

Figure 4:
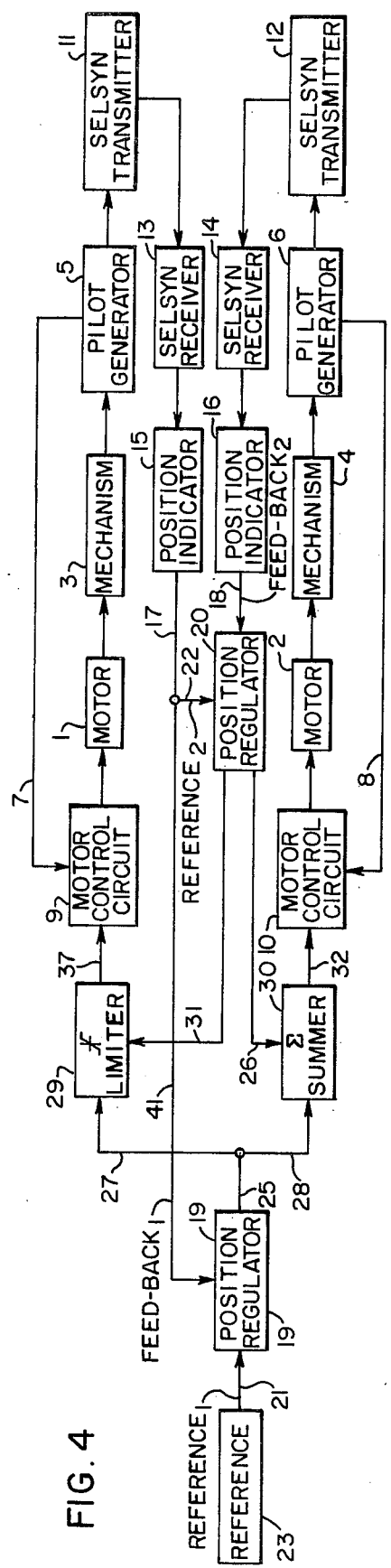
FIG. 4 is another system according to the present invention combining individual drive positioning and motor-slave positioning.

FIG. 4 shows another embodiment of the present invention, also with like reference numerals to identify like elements found in FIGS. 1 and 2.

As in FIG. 2, a common reference 23 and position regulator 19 respond to a feedback position signal received from the master drive 3 via line 41. An error signal is derived controlling both motor control circuits, 9 and 10 via lines 25 and respective lines 27, 28. Line 27 is connected to a limiter 29 before inputting via line 37 into the motor control circuit 9. Line 28 is connected to a summer 30 before inputting into the motor control circuit 10. Each motor drive 1, 3 or 2, 4 has a position loop including a combination of selsyn transmitting and receiving devices 11, 13 or 12, 14, and of position indicators, 15 or 16. Besides the position feedback loop, via line 41 to the position regulator 19 just mentioned, the system of FIG. 4 presents this particularity that the outputs of the two position indicators 15 and 16 of the respective motor drives 1, 3 and 2,4 are compared by a position regulator 20 in order to generate an error signal which via line 26 is received by the summer 30. As a result, whenever the motor drive 2,4 does not follow motor drive 1, 3 a correction signal on line 26 will change the speed of motor 2 as prescribed by the control signal on line 32. In other words motor 2 and mechanism 4 have been made slave of the motor 1 and mechanism 3. In addition, from position regulator 20 a signal is derived via line 31 controlling the limiter 29. Whenever the error detected by position regulator 20 is large, limiter 29 will limit the effect of the signal appearing on line 27 and controlling the motor control circuit 9 of the master motor 1. As a result, whenever control of the master motor is such that the master mechanism has run ahead of the slave mechanism, the master motor will wait, and the slave motor will be able to catch up with the master motor.

It appears that in the embodiment of FIG. 4, the feedback signal of the positioning loop of the master motor drive is used as a reference for the position regulating loop of the other motor drive. In addition, the master motor drive is limited so that it cannot run ahead of the second drive. The error signal of the position regulator of the master motor drive is common to both position regulators, so that the second position error signal causes merely a vernier adjustment on the speed signal of its loop. This system provides an accurate control of the motor drives with regard to both tracking and final stop position. The accuracy of the system is equal to the most significant increment of accuracy built into the individual positioning systems. This second embodiment of the present invention is perfectly suited for controlling the right and left screwdown mechanisms of work rolls in a rolling mill.

Figure 5:
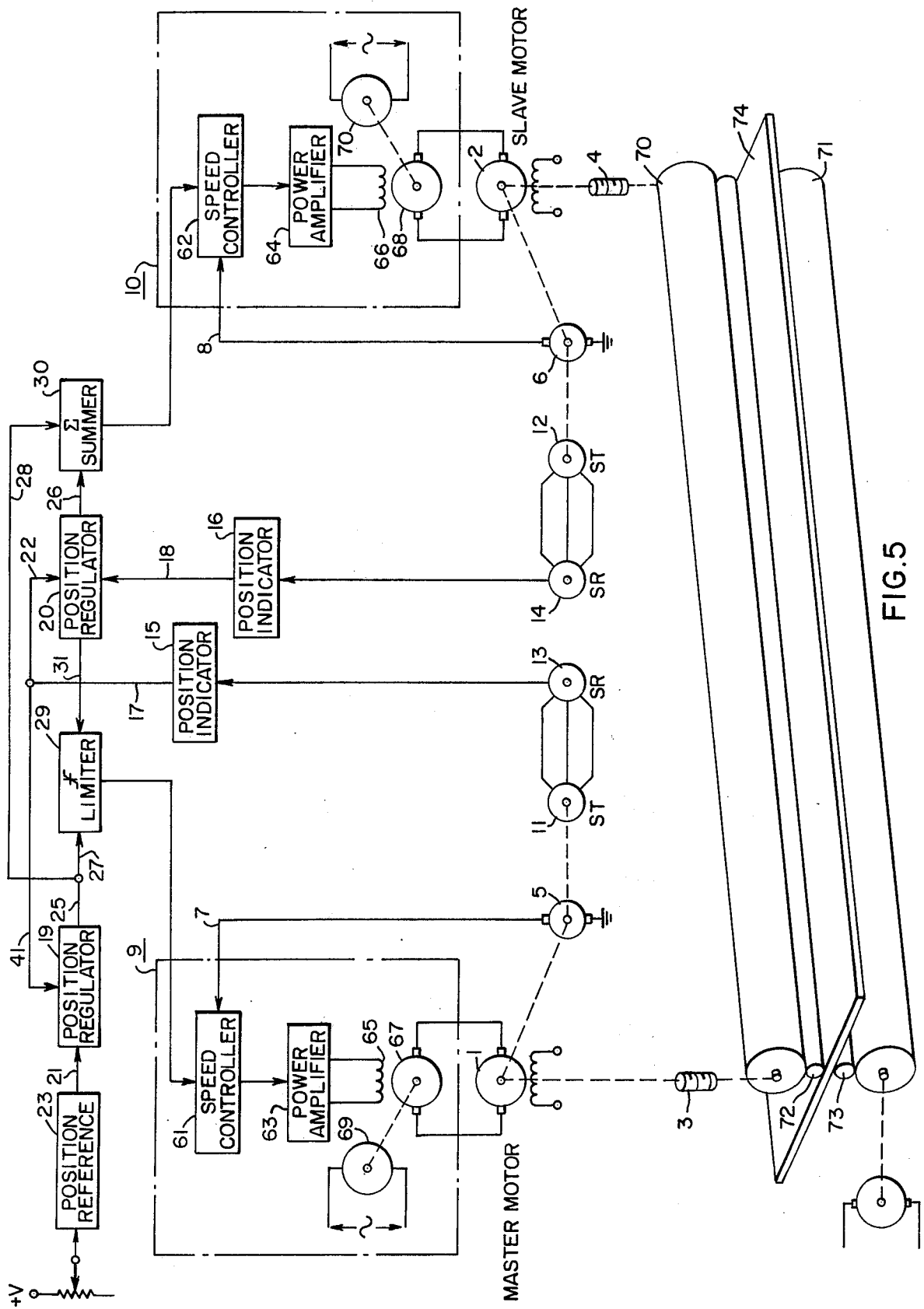
FIG. 5 shows the preferred embodiment of the invention in accordance with the system of FIG. 4.

The preferred embodiment of the present invention will be now described in the context of application to a rolling mill and by reference to FIG. 5. In FIG. 5, like numerals are used to designate like elements found in FIG. 4. The motor control circuits 9 and 10, each includes a speed controller (61, 62) regulating the output of a power amplifier (63, 64) providing DC energization for the main field (65,66) of a generator (67,68) driven by an electric motor (69, 70). The generator energizes the associated motor (1 or 2). Motors 1 and 2 are mechanically coupled to the right and left screwdown mechanisms (3, 4) of a workstand of a rolling mill comprising main rolls 70, 71 which cooperate with working rolls 72, 73 in establishing therebetween a desired roll gap to suit the required gauge of a workpiece 7 being rolled. The electrical shaft system of FIG. 4 is directly applied to the screwdown mechanism of FIG. 5. The electrical shaft according to the present invention provides a very accurate self-tracking positioning of the two connected screwdown mechanisms. The position indicators 15, 16 generate a series of pulse which are indicative of position. By selecting the rate of the pulses generated for each increment of the associated selsyn receiving device, it is possible to detect error signals on lines 25 and 26 having the required sensitivity to displacement of the screw, 3 or 4. The error in position detected by the position regulator, 19 or 20, indicates at any given time the position of the screw relative to the final position. In accordance with the present invention, the position regulator is so designed that when the error sensed between the two inputs is above a predetermined minimum, the control signal generated at the output to the speed regulator 61 or 62, causes the associated motor 1, or 2, to run at a constant speed. However, when the error in position has been reduced below the above predetermined minimum the control signal generated follows a non-linear down curve to zero, so that the speed of the controlled screw 3, or 4 is reduced progressively to zero while coasting to the final position.

While the preferred embodiment has been described and illustrated in the context of a screwdown mechanism for a rolling mill, it will be apparent to those skilled in the art that various changes and modifications may be made therein without departing from the invention in its broader aspects. The electrical shaft according to the present invention, is particularly useful for a screwdown mechanism of a rolling mill. It is applicable, more generally for electrically coupling two non-mechanically connected motor drives which must be run as a unit. Also, more than one slave motor and driven mechanism can be assigned to follow the same master motor and mechanism. Also the selsyn transmitting and receiving devices constitute only one mode of deriving an electrical representation of the rotational movement of the motor drive to be used for an instantaneous determination of positional increments of the movable members. Analog or digital circuits can be used for deriving position signals.

What is claimed is:

1. A system for imparting to at least two members correlative displacements along separate trajectories, comprising a master drive motor mechanically coupled to one of said members as a master member, and at least one slave drive motor mechanically coupled to at least another member as a slave member;

first control means continuously responsive to a first reference position and to incremental displacements of said master member for providing a first command signal for controlling said master drive motor and said slave drive motor to displace said master member and said slave member in accordance with said first reference position;

second control means continuously responsive to a second reference position and to incremental displacements of said slave member for providing a second command signal for controlling said slave member;

said second reference position representing actual positioning of said master member; and summer means interposed between said first and second control means and responsive to said first and second command signals for controlling said slave drive motor to maintain said slave member in alignment with said master member.

* * * * *